(12) United States Patent
De Gaulle

(10) Patent No.: US 6,482,287 B1
(45) Date of Patent: Nov. 19, 2002

(54) METHOD FOR INCLUDING AN ELECTRONIC LABEL IN THE WALL OF A HEAT-TRANSFORMED OBJECT AND PREPARATORY DEVICE FOR THIS METHOD

(75) Inventor: Antoine De Gaulle, Paris (FR)

(73) Assignee: TLOG, Paris (FR)

(*) Notice: Subject to any disclaimer, the term of this patent is extended or adjusted under 35 U.S.C. 154(b) by 0 days.

(21) Appl. No.: 09/381,416

(22) PCT Filed: Mar. 20, 1998

(86) PCT No.: PCT/FR98/00560

§ 371 (c)(1),
(2), (4) Date: Dec. 6, 1999

(87) PCT Pub. No.: WO98/42488

PCT Pub. Date: Oct. 1, 1998

(30) Foreign Application Priority Data

Mar. 21, 1997 (FR) .............................. 97 03456

(51) Int. Cl.⁷ ..................... B29C 45/14; B65D 25/00
(52) U.S. Cl. ................. 156/245; 156/309.6; 156/506; 264/272.11; 264/272.15; 264/272.17; 264/275; 343/700 MS
(58) Field of Search ............... 264/272.17, 275, 264/279, 271.1, 509, 272.15, 272.11, 266; 156/242, 245, 155, 309.6, 500; 428/576; 365/94; 340/572.1, 572.7, 372.8, 572.8; 152/152.1; 73/146.5; 343/700 MS, 895

(56) References Cited

U.S. PATENT DOCUMENTS 3,270,101 A * 8/1966 Jardine et al. ............... 156/245
4,795,657 A * 1/1989 Formigoni et al. .......... 365/100
4,911,873 A * 3/1990 Kuzuya et al. .............. 264/148
5,523,749 A * 6/1996 Cole et al. ................ 340/10.34
5,541,399 A * 7/1996 de Vall ........................ 343/895
5,697,319 A * 12/1997 Steensland et al. ......... 114/357
6,173,514 B1 * 1/2001 Peterson ........................ 40/1.5

FOREIGN PATENT DOCUMENTS

| EP | 0 340 100 A | 11/1989 |
| EP | 0 521 343 A | 1/1993 |
| FR | 2 697 801 A | 5/1994 |
| JP | 60 166516 A | 8/1985 |
| JP | 01 005023 A | 10/1989 |
| JP | 04 138296 A | 5/1992 |
| JP | 07 081284 A | 3/1995 |
| NL | A 9400402 | 3/1994 |
| WO | WO 93/24381 | 12/1993 |
| WO | WO 96/11098 | 4/1996 |

\* cited by examiner

Primary Examiner—Michael W. Ball
Assistant Examiner—Barbara J. Musser
(74) Attorney, Agent, or Firm—Hoffmann & Baron, LLP

(57) ABSTRACT

According to this process for inclusion of a thin electronic label (1) with a flat face, at a predetermined depth in the wall of a molded item made of plastic material (15) at a predetermined temperature and pressure, the flat face of the label (1) is first attached to a support (5) made of a plastic material, with a thickness essentially equal to the desired inclusion depth, the support (5) is attached to the wall (13) of the mold, then the plastic molding material (15) is brought into the mold (13, 14) at said pressure and temperature so that an intimate bond is formed by melting in the region of contact (8, 9, 10, 16) between the two plastic materials at the time of molding.

16 Claims, 1 Drawing Sheet

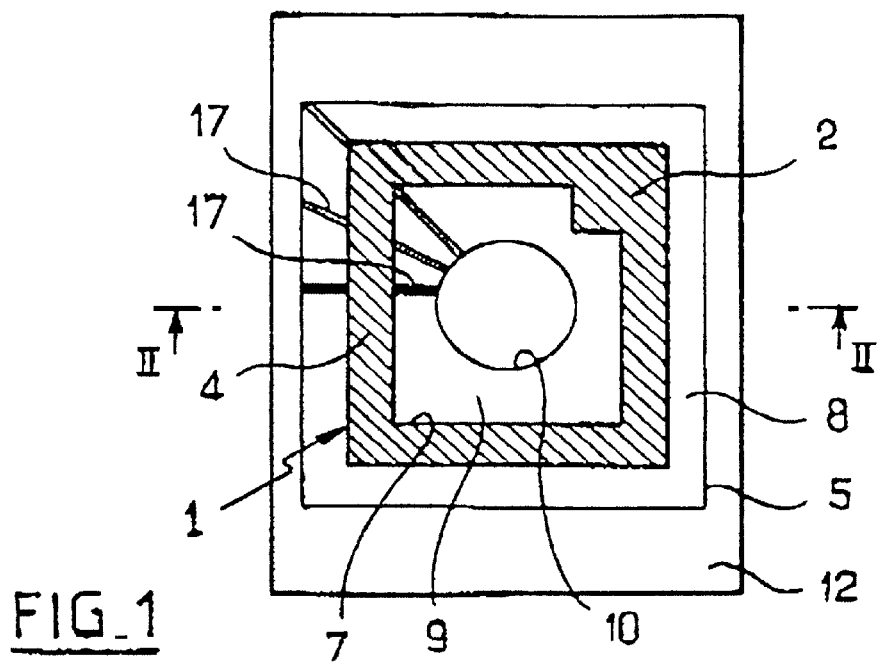
FIG_1
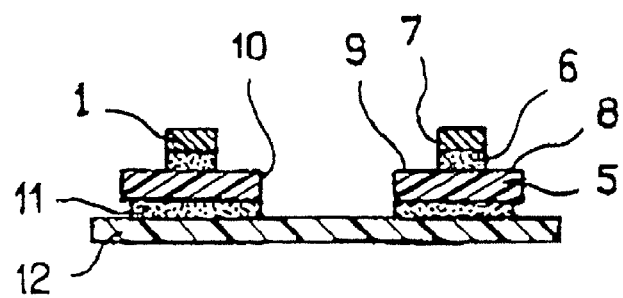
FIG_2
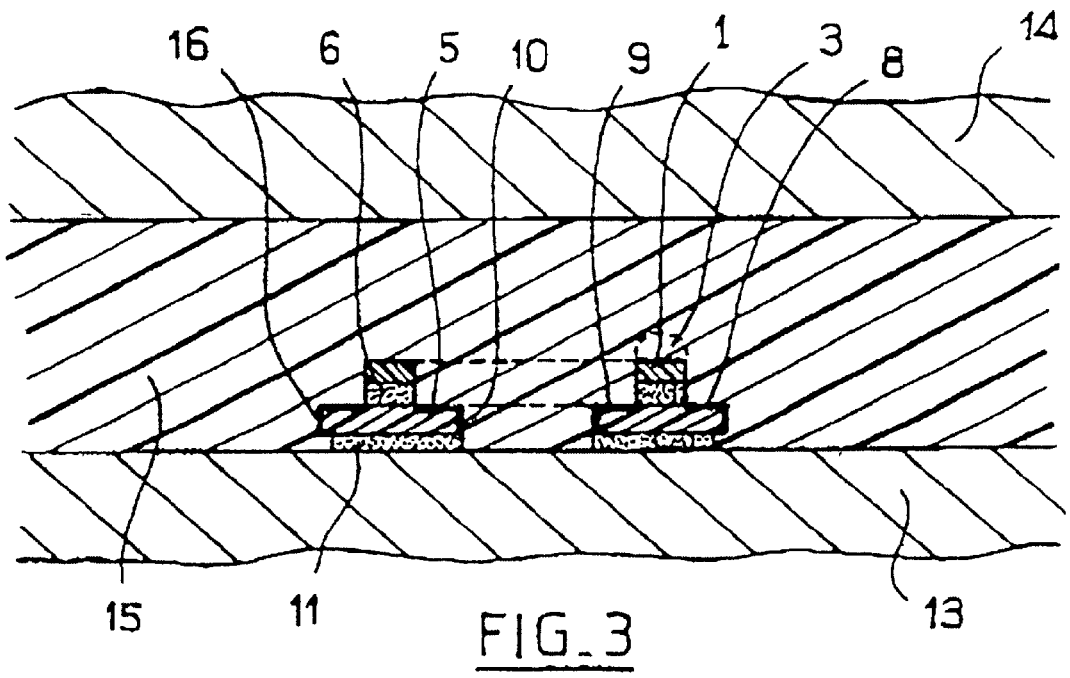
FIG_3

METHOD FOR INCLUDING AN ELECTRONIC LABEL IN THE WALL OF A HEAT-TRANSFORMED OBJECT AND PREPARATORY DEVICE FOR THIS METHOD

BACKGROUND OF THE INVENTION

This invention concerns a process permitting the insertion of a thin electronic label with a flat face into the wall of an object made by hot plastic transformation (injection molding or compression, rotational molding, or blowing) under pressure of thermotransformable plastic materials, particularly ABS (acrylonitrile-butadiene-styrene), polyurethanes, and polyolefins, such as polypropylene or polyethylene (particularly high-density polyethylene—HDPE). In the following we will use the term "molding" to refer to any thermotransformation that occurs in a mold, whether it is true molding or blowing. The inserted label makes it possible to identify the object containing it at a distance and without contact; this is particularly desirable when the objects identified must be authenticated or sorted. It is introduced without the need for modifying either the injection process or the injection device. The items in question are diverse, and may be containers (tubes, garbage cans, flasks, and bottles), pallets, vehicle components (shield, dashboards), and works of art.

Based on the documents WO 93 24381 A, NL 9 400 402 A or FR 2 697 801 A, it is known that we can identify an object by an electronic label placed on the object or incorporated into it. The first two documents give information for incorporating a transponder or electronic label into a relatively thick wall of the object at the time of molding. More specifically, according to the document WO 93 24381 A, the label is enclosed beforehand in a protective casing to protect it from the molding temperatures and pressures. This casing is placed directly on a wall of the mold by means of a slit in the mold, or is held between the two walls of the mold by permanent or temporary pins.

BRIEF DESCRIPTION OF DRAWINGS

FIG. 1 is a schemtic top view of a label shown on a temporary support,

FIG. 2 is a section II—II of FIG. 1,

FIG. 3 is a sectional view of the label in place in the mold.

DETAILED DESCRIPTION OF THE INVENTION

The purpose of the invention is to improve the process of inclusion molding of electronic labels at the time of molding, particularly to allow a simple placement, virtually anywhere desired, and which can be performed even in a thin molded wall.

According to the invention, the flat face of the label is first fixed to a plastic support with a thickness essentially equal to the desired inclusion depth. The support is fixed to the wall of the mold and the plastic material to be molded is brought into the mold at a predetermined pressure and temperature. The plastic material of the support is chosen as a function of the plastic molding material and of said pressure and temperature, so that an intimate bond will form in the contact region between the two plastic materials at the time of molding. This bond is an autogenous weld, obtained by melting and interpenetration of the two plastic materials in the region of contact. During the welding process, the support serves as a pad to cushion the transitory pressures due to the injection. During molding, it melts, at least on the surface which is in contact with the molding material, and deeper, depending on the nature of the plastic material chosen, and particularly on its melting point. At the end of the molding operation, it forms an integral part of the molded wall of the object.

It is preferable for the melting point of the plastic support material to be lower (and preferably considerably lower) than that of the plastic molding material, so that it can melt dependably in contact with the molding material.

The plastic molding material and the support material are advantageously chosen from high-density polyethylenes; the support material has a lower density than the molding material to establish the difference between the melting points mentioned above. For example, the melting temperatures of the first and second HDPE can be in the ranges of 150–200° C. and 200–250° C., respectively. However, as mentioned above, ABS or polyurethanes are also suitable.

For the support and the molding, it may be advantageous to choose different colors (e.g., translucent and red, respectively), so that the location of the label on the molded wall can immediately be visually identified for use (correct placement of the identification reader). This presents the additional advantage of allowing selective sorting if the molded object is destroyed, with separate treatment and/or recycling of the plastic part and the part containing the label.

The label can be placed on any part of the mold, but it is preferable to choose a zone near a reinforced area, which is not likely to cause undue bending of the label itself.

The thin flat electronic label used in the invention is of a known type, but this invention has established that thin labels could be incorporated during molding without a protective casing, unlike the information, for example, in document WO 93 24381 A, cited above. The label is an inductive label, without energy, consisting of an electrical circuit forming an antenna, printed on an insulating substratum of appropriate quality, connected to an integrated circuit which includes a memory and the communication devices with this memory from the outside and without contact. The term "substratum of appropriate quality" means that it is resistant to temperatures of about 200° C. which occur during molding, and that it has a certain degree of rigidity, but is still flexible; this rigidity contributes to its correct maintenance and resistance to folding during molding. The substrata currently used made of thin epoxy, for example one to a few tens of mm, have this quality. Other materials such as kapton or PET are also appropriate. The content of the memory can be read, or even modified, without contact by the passage of electromagnetic waves through a certain thickness of the plastic material of the substratum and the wall of the object in which it is molded. Although the identifying electromagnetic waves can theoretically be BF, HF, or UHF waves, the invention is concerned primarily with labels using somewhat higher frequencies (about 10 MHz, particularly the approved frequency 13.56 MHz), with which it is possible to use a small antenna printed on the substratum (unlike certain transponders of the prior art, using antennae with multiple coils, which can be damaged during molding). However, the process is applicable at lower frequencies, particularly lower than 150 KHz, with a printed antenna. The printing of an antenna, particularly with serigraphed electrographic ink, is a well-known process (e.g. document FR 2 753 305 A).

The label has at least one largely flat face, generally the one opposite the integrated circuit, and the other face often has a bead of resin to protect the silicon chip of the integrated circuit. The total thickness of the thin label is about 0.6 to 1 mm to the right of the chip. By "flat" we mean primarily an essentially planar geometric surface, but also, more generally, a developable surface (such as a cylinder), to which a support sheet can be attached. A surface of this kind is better able to take on the shape of certain molded items.

The support is advantageously attached by adhering one part to the flat face of the label and/or the other part to the wall of the mold; this can be done with a strip of double-sided adhesive. However, the support can be maintained in the mold before and during molding by other means, such as aspiration through suction holes in the wall of the mold, although this solution is more expensive, and limits the freedom of placement of the label in the mold.

The adhesive used to attach the label to the support is a double-sided adhesive with strong adhesive qualities on both sides (since it must attach materials with poor adhesive power, such as polyethylene) and it must be resistant to molding temperatures.

The adhesive used to attach the support to the mold is strongly adherent to the face which will receive the support, but only weakly adherent to the other face on which the steel of the mold will be attached. Adherence of a removable adhesive type is sufficient, because the steel allows for good natural attachment. Besides this, it is advantageous to present labels along with their support and with the two adhesives on a temporary antiadhesive support, such as a silicon-coated film, from which it is detached and then attached to the mold. The double-sided adhesive, which is in contact with the mold at the time of molding and is not directly exposed to the molding material, must be resistant to a temperature generally lower than 100° C. (taking into account the generally abrupt cooling of the molds). It must be as thin as possible, so that when it is removed, it does not create too much of a cavity.

It is advantageous for the label support to be cut out of a thin piece of plastic material with a chemical nature and physical characteristics selected to create the weld by melting as mentioned above. It is preferably less than 1 mm thick, and is advantageously on the order of 500 $\mu$m. If it is too thick, a higher temperature lag against heating and localized melting of the support in contact with the molding material will result. On the other hand, if it is too thick, this can lead to phenomena of reflux and molding irregularities when the melted molding material passes over the label attached to the mold.

According to one advantageous variant, the support is prepared in a sheet directly coated on both sides with the adhesive required to attach the label on one side and the mold on the other (or the temporary support), making it unnecessary to use the double-sided adhesives mentioned above.

It is preferable for the size of the support to exceed that of the label in such a way that it creates a sufficiently large contact surface between it and the molding material for solid integration of the label with the molded object. This contact surface is provided on the outside of the label, and/or by cutting of a central part of the label which is not occupied by the printed circuit, on the inside of the label.

Advantageously, when the dimensions of the label make it inconvenient to cut out a central part, the support also has a hole in the center, so that the molding material can flow as far as the wall of the mold, to the center of the label and the support, and facilitate the degassing of the plastic material.

The part of the support surface which exceeds the size of the label, on the outside and/or the inside, may contain canals facilitating the evacuation of gases and contributing to the absence of bubbles.

Although not necessary according to the invention, the label may receive, on the face other than the flat face, other cover elements such as a sheet of plastic material; it may also be encased beforehand in a block of plastic material before being placed on the support, or said block may directly constitute, on the side of the flat face of the label, said support if the material forming the block is well chosen.

The invention also concerns as an intermediate means intended for the above-mentioned process, a preparatory device for the inclusion of a thin electronic label with a flat face, at a predetermined depth in a wall of a molded plastic item under predetermined temperature and pressure, characterized in that it includes said label and a support of plastic material, whose thickness is essentially equal to the desired inclusion depth. On this support, there is fixed said flat face of the label, the plastic material of the label support being chosen as a function of the plastic molding material and said temperature and pressure so that an intimate bond is established by melting in the contact region between the two plastic materials at the time of molding. The support is advantageously attached by adhering to the flat face of the label. It is preferable for the support to be attached by means of a relatively weak adhesive to a temporary antiadhesive support, such as in a strip which can group together several labels, each label including a substratum on which there is an integrated circuit and a printed antenna.

Finally, the invention naturally concerns the molded plastic item itself, containing an electronic label which has been included in a wall of the item by the process of the invention.

EXAMPLE

The invention can be better understood by the following example, with reference to the attached drawings, in which:

FIG. 1 is a schematic top view of a label shown on a temporary support,

FIG. 2 is a section II—II of FIG. 1;

FIG. 3 is a sectional view of the label in place in the mold.

The figures are intended to include the arrangement of the various elements of the invention with respect to each other, but the relative scale of these elements is not reproduced exactly, for the sake of greater readability and as will be shown by the examples of the dimensions given in the following description.

The thin label 1 represented in FIGS. 1 and 3 is present in the form of a substratum or thin film, for example, an epoxy with a thickness of 0.13 mm, with a generally square shape (for example, 28 mm×28 mm), on which there is, on the one hand, the integrated circuit (chip) protected by a bead of resin 3 (thickness to the right of the chip 0.70 mm), and, on the other hand, a serigraphed antenna 4 (thickness to the right of the serigraph 0.18 mm) arranged in a square for a large interception surface. The label 1 is attached to its support 5 according to the invention by means of a double-sided adhesive 6, 0.127 mm thick and with a high degree of adhesion, for example the adhesive Y9492 sold by the 3M Company (resistance to peeling at 180° on steel of 16.3 N/cm after 72 h).

The label 1 and its adhesive 6 are cut out on the inside to free up an internal opening 7 (no active element of the label is within the central zone of the label 1).

The support 5, for example 35 mm×35 mm, is larger than the ensemble 6,7, both outside (outside surface 8) and inside (inside surface 9). The support 5 is made of a polyethylene film with a relatively high molecular weight and a thickness between 0.55 mm and 0.65 mm.

The support 5 is put in place with the help of a double-sided adhesive 11 on a silicone-coated film 12 (temporary support) with a thickness of 0.10 mm. Several labels can be placed one after another on a band of silicon-coated film, which may be coiled.

The double-sided adhesive may be the adhesive 9871, 0.062 mm thick, supplied by the 3M Company. A hole 10 (with a diameter, for example, of 12 mm) is made at the center of the support 5 and the adhesive 11. As shown in FIGS. 2 and 3, the periphery of the adhesive 11 may be slightly smaller than the periphery of the support 5, or even flush with it, but it is preferable if it does not extend past the edges, so that, at the time of molding, no bonds are created with the molded material which might make it difficult to remove the adhesive after removal from the mold.

For the molding operation, the label 1 is removed, with its support 5 and the adhesive 11, from the silicon-coated film 12 and, when the mold is opened, it is adhered with the adhesive 11 to the desired location on the steel wall 13 of the mold 13, 14. The plastic molding material 15 can then fill in the gap between the two walls 13, 14, and comes in contact with the label 1 and the parts of the support 5 which are not covered by the label 1. On these parts, essentially the free surfaces 8 and 9, and also on the internal periphery of the hole 10, if it is present, or the external periphery 16 of the support 5, the plastic material of the support 5 melts at least superficially in contact with the molding material 15, so that a weld zone is formed between the two materials, represented with a solid line in FIG. 3. The hole 10 allows the molded material to reach the wall of the mold in the central part of the label, and thereby facilitates the degassing of the polyethylene through the walls. To facilitate the progress of the gas, it is also possible to provide, on the surfaces 8 and 9 of the support 5, trenches or channels 17 with a depth less than or equal to the thickness of the support 5, in a diverging star pattern, and emerging either in the inside hole 10 or on the external periphery 16 of the support 5. FIG. 1 shows only a few of these channels 17.

The relatively weak adherence of the adhesive 11 on the steel wall 13 does not hinder removal from the mold, and the adhesive 11 can then be removed from the surface of the molded item.

The following tests were conducted successfully.

Electronic labels manufactured by GEMPLUS under reference number SMA210 and LMA 210 were attached to a translucent polyethylene support as described above, and the label support holding the label was fixed to the wall of the mold at the desired point, and was kept in this position during the injection, in spite of the stresses exerted by the injected high-density polyethylene (temperature of the injected material when it penetrated the mold: about 270° C.; injection pressure between 1000 and 1500 bars).

All labels attached in this way functioned normally.

What is claimed is:

1. A process for including a thin electronic label with a flat face, at a predetermined depth in a wall of a molded object made of plastic material at predetermined temperature and pressure, comprising:
    providing a support made of plastic material having a first side, a second side and a thickness essentially equal to the desired inclusion depth;
    attaching the flat face of said electronic label to the first side of said support by directly adhering the flat face of said label to the first side of said support;
    fixing the second side of the support to the wall of the mold; then
    introducing the plastic molding material into the mold at said pressure and temperature, wherein said plastic molding material directly contacts said electronic label;
    said plastic label support having a composition and thickness capable of both supporting said electronic label and forming an autogenous weld with said plastic molding material in the contact region between the support and the molding material at the time of molding.

2. The process according to claim 1, wherein the fixing step includes adhering the second side of said support to the wall of the mold.

3. The process according to claim 2, wherein said adhering is done with a double-sided adhesive.

4. The process according to claim 3, wherein prior to molding, a label with its support and double-sided adhesive is prepared and put in place on a temporary antiadhesive support.

5. The process according to claim 1 wherein the melting point of the plastic support material is lower than that of the plastic molding material.

6. The process according to claim 1 wherein the plastic molding material and the support material are chosen from the group consisting of high-density polyethylenes.

7. The process according to claim 1 wherein the support of the label is cut out from a thin sheet of plastic material.

8. The process according to claim 7, wherein the support is prepared in a sheet directly coated on both faces with an adhesive needed to make it adhere on one side to the label and on the other to the wall of the mold.

9. The process according to claim 1 wherein part of the support surface not covered by the label extends beyond the label on the outside and/or on the inside.

10. The process according to claim 9 wherein said part of the support surface has channels.

11. The process according to claim 1, wherein said plastic label support thickness is in the range of 0.5 mm to 1 mm.

12. The process according to claim 11, wherein said plastic label support thickness is in the range of 0.55 mm to 0.65 mm.

13. The process according to claim 1, wherein said label and said support each have a central portion containing a hole, wherein said holes allow said molding material to flow to the wall of the mold and facilitate degassing of said plastic molding material.

14. A preparatory device for inclusion of a thin electronic label with a flat face, at a predetermined depth in the wall of a plastic molded item made from plastic molding material at a predetermined temperature and pressure and at a selectable location relative to the wall of a mold for said molded item, said preparatory device comprising said electronic label, and a support made of plastic material having a first side, a second side and a thickness essentially equal to the desired inclusion depth; the first side of said support being adhered to the flat face of said label, the second side of said support having a relatively weak adhesive adapted to removeably adhere said preparatory device to the wall of said mold;
    wherein said plastic label support has a composition and thickness capable of both supporting said electronic label and forming an autogenous weld with said plastic molding material in the contact region between the support and the molding material at the time of molding;
    wherein said electronic label includes an electrical circuit forming an antenna printed on an insulating substratum and connected to an integrated circuit having a memory; and wherein said electronic label is adapted to directly contact said molding material.

15. The device according to claim 14 wherein the support is attached by means of a relatively weak adhesive to a temporary antiadhesive support.

16. The device according to claim 14 wherein part of the support surface not covered by the label extends beyond the label on the outside and/or on the inside.

* * * * *